United States Patent [19]
Akai

[11] Patent Number: 5,373,162
[45] Date of Patent: Dec. 13, 1994

[54] RADIATION DETECTOR FOR LIMITING EFFECTS OF SHADING

[75] Inventor: Yoshimi Akai, Tochigi, Japan

[73] Assignee: Kabushiki Kaisha Toshiba, Kawasaki, Japan

[21] Appl. No.: 29,590

[22] Filed: Mar. 11, 1993

[30] Foreign Application Priority Data

Mar. 13, 1992 [JP] Japan ................................. 4-55711

[51] Int. Cl.$^5$ .......................................... G01T 1/20
[52] U.S. Cl. .................................. 250/366; 250/367
[58] Field of Search ............. 250/366, 363.10, 370.11, 250/367

[56] References Cited

U.S. PATENT DOCUMENTS

| | | | |
|---|---|---|---|
| 4,180,737 | 12/1979 | Kingsley | 250/367 |
| 4,429,227 | 1/1984 | DiBianca et al. | 250/367 |
| 4,459,486 | 7/1984 | Brunner et al. | 250/367 |
| 4,731,534 | 3/1988 | Klein et al. | 250/366 |

FOREIGN PATENT DOCUMENTS

| | | | |
|---|---|---|---|
| 133671 | 10/1981 | Japan | 250/366 |
| 85484 | 4/1988 | Japan | 250/366 |

*Primary Examiner*—Carolyn E. Fields
*Attorney, Agent, or Firm*—Finnegan, Henderson, Farabow, Garrett & Dunner

[57] ABSTRACT

A radiation detector comprises a large number of detector elements each having its detecting surface directed toward a source of radiation and collimator plates each standing in the direction of emission of radiation from the source and placed over a gap between adjacent detector elements. The gap is made greater than the thickness of the collimator plates, reducing the area of the shade of a collimator plate on the radiation detecting surface of the corresponding detector element. Thus, the variations in sensitivity of channels due to variations in the area of the shade of the collimator plates are reduced. The gap permits an adverse effect of the misalignment of the collimator plate on the channel sensitivity to be reduced.

4 Claims, 6 Drawing Sheets

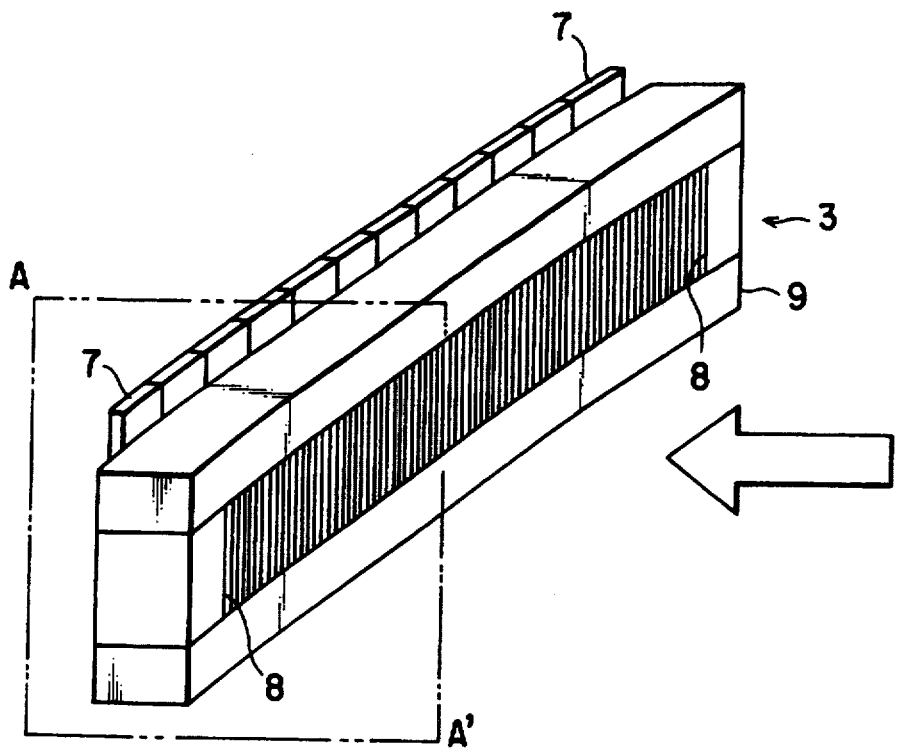
F I G. 6
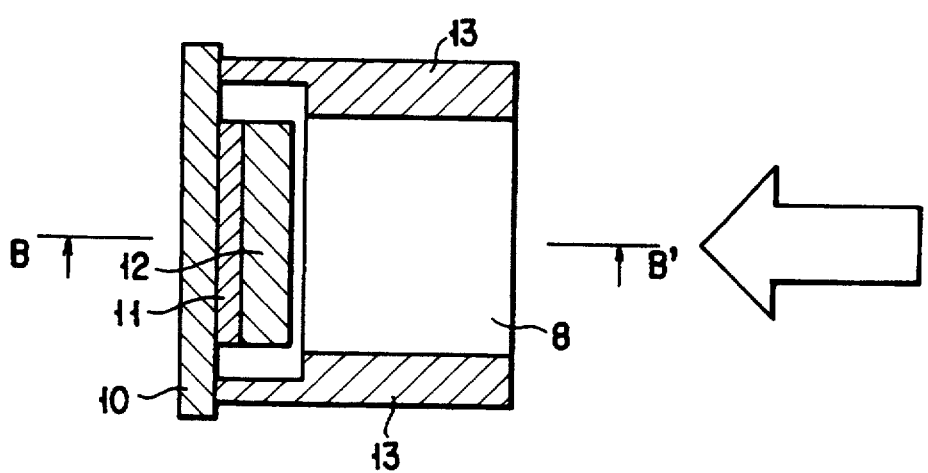
F I G. 7

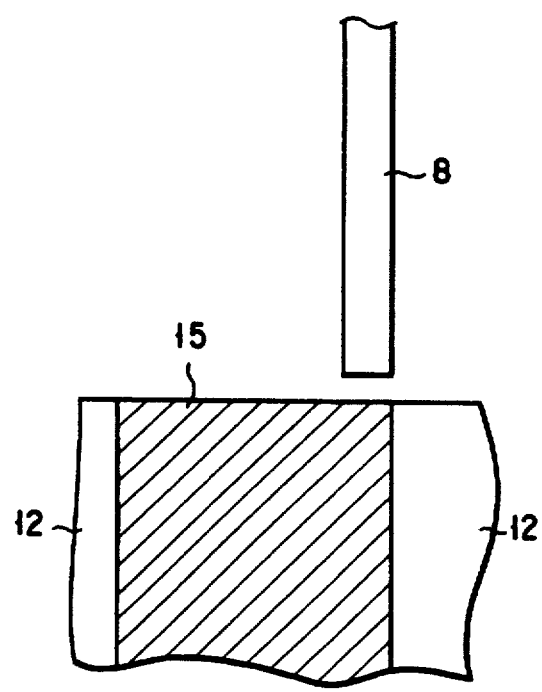
F I G. 14

RADIATION DETECTOR FOR LIMITING EFFECTS OF SHADING

BACKGROUND OF THE INVENTION

1. Field of the Invention

The present invention relates to a radiation detector for use with radiation apparatus such as X-ray computerized tomography apparatus.

2. Description of the Related Art

A radiation detector is often used with X-ray computerized tomography apparatus (hereinafter referred to as X-ray CT apparatus).

The X-ray CT apparatus is a clinically useful apparatus which performs image reconstruction processing, such as successive approximation or Fourier transformation, on projection data obtained from various directions for a predetermined plane of a subject under examination, computes a CT value at each of points representing the plane, and imparts a proper gradation to the CT value, thereby obtaining a tomography image of the plane of the subject. The third-generation X-ray CT apparatus, in which an X-ray tube and a radiation detector turn around a subject to be examined, is constructed as follows.

An X-ray tube emitting X-rays from its focus and a multichannel radiation detector are supported so that they can turn while facing each other with an aperture therebetween. Data acquisition is performed by repeating emission of X-rays and detection of transmitted X-rays each time the X-ray tube and the radiation detector turn around a subject to be examined placed within the aperture through a very small angle.

In the multichannel radiation detector for use with such X-ray CT apparatus, blocks each having an array of many detector elements thereon are arranged in the form of a circular arc with center at the focus of the X-ray tube. On the X-ray tube side of the blocks is disposed a collimator whose collimator plates stand along the direction of emission of X-rays from the focus of the X-ray tube. Each of the collimator plates is placed over the gap between adjacent detector elements.

On the block substrate photodiodes are first, placed and scintillators are next placed on the photodiodes. Also, a housing for supporting the collimator plates is mounted on the block substrate.

FIG. 1 is a sectional view of a radiation detector. In order to shut out scintillations from other detector elements (channels), a reflector 14 (indicated by oblique lines) is interposed between scintillators 12.

FIG. 2 is an enlarged view of a portion indicated by dotted circle in FIG. 1. The thickness T1 of the reflector 14 is determined according to only the pitch of photodiodes 11. Thus, the thickness T1 of the reflector 14 is generally less than the thickness T2 of a collimator plate 8.

The focus of the X-ray tube moves because of thermal expansion of its parts which occurs during operation. In particular, the component of movement along the direction in which the detector elements are arranged (hereinafter referred to as the channel direction) is mainly due to the thermal expansion of cathode parts. The movement of the focus varies the sensitivity of the detector elements. In the following the "movement" refers to the "movement along the channel direction", unless otherwise specified. The reason will be described below with reference to FIG. 3. In FIG. 3, focus 1 is assumed to be the focus maintained at low temperatures, while focus 1' is assumed to be the focus when the quantity of heat stored in the anode plate and parts of the X-ray tube has reached the heat capacity, that is, when focus 1 has traveled the maximum distance. Note that the collimator plates 8 structuring the collimator are aligned with respect to the focus 1 located at low temperatures (at the time of design).

When the focus 1 moves toward the focus 1' as the anode plate expands, the collimator plate 8 makes shade (indicated by oblique lines) on the detecting surface of the scintillator 12. The shade reaches its maximum when the focus of the X-ray tube is located to the point 1', resulting in a decrease in the original width W1 of the detecting surface of the scintillator 12 by W2. That is, the channel sensitivity decreases gradually as shown in FIG. 4 as the focus moves. The variations in channel sensitivity can be compensated for easily.

However, the variations in channel sensitivity differ from channel to channel. This is due to the fact that the focus 1 does not move on a circular arc to fit the arrangement of the collimator plates and thus the degree of growth of the shade varies from channel to channel. The difference in sensitivity between channels causes a problem that a ring-like artifact may appear in a tomography image.

The compensation for lack of uniformity of sensitivity among channels has been made so far. However, this compensation is limited to compensation for differences in the fluorescent characteristic of scintillators and in the photoelectric transfer characteristic of photodiodes, and no attention is paid to the differences in the degree of growth of the shade of the collimator plates among channels. The compensation for the difference in sensitivity between channels due to the difference in the degree of growth of the shade of the collimator plates between channels requires a lot of work of measuring the variation in sensitivity caused by the movement of the focus of the X-ray tube and obtaining a compensation curve for each channel. This is virtually impossible.

The conventional radiation detector also has the following problem. This arises from collimator alignment errors. That is, each of the collimator plates is not always located accurately between detector elements nor formed accurately along the direction of emission of X-rays from the X-ray tube. Depending of the severity of the alignment errors, the size of the shadow of the collimator plate on the detecting surface of the scintillator may differ from channel to channel. Thus, the alignment errors further increase the difference in sensitivity between channels.

SUMMARY OF THE INVENTION

It is therefore an object of the present invention to provide a radiation detector which is simple in construction and which minimizes the effect that the shade of collimator plates declines the sensitivity, maintains a constant channel sensitivity and reduces the adverse effect of collimator plate alignment errors on channel sensitivity.

According to the present invention there is provided a radiation detector comprising:

a large number of detector elements arranged with their detecting surfaces directed toward a source of radiation; and collimator plates each standing along the direction of emission of radiation from the source of radiation and placed over a gap between adjacent detector elements, the gap being greater than the thickness of the collimator plates.

With this construction, since the gap intervenes between the collimator plate and the detecting element, that area of the detecting surface of the detector element which is covered with the shade of the collimator plate can be reduced. Therefore, the variations in channel sensitivity due to the growth of the shade of the collimator plate can be reduced.

In addition, since the gap allows for misalignment of the collimator plate, an adverse effect of alignment errors of the collimator plates on the channel sensitivity can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 6 is a perspective view of the radiation detector shown in FIG. 5;

FIG. 7 is a cross-sectional view taken along line A-A' of FIG. 6;

FIG. 14 shows another positional relationship of a collimator plate to the corresponding reflector.

DETAILED DESCRIPTION OF THE PREFERRED EMBODIMENTS

Hereinafter, a radiation detector according to an embodiment of the present invention will be described with reference to the accompanying drawings.

The radiation detector of the present invention is often used with X-ray computerized tomography apparatus (hereinafter referred to as X-ray CT apparatus). It is therefore useful to describe an application of the radiation detector to the X-ray CT apparatus.

Figure 1:
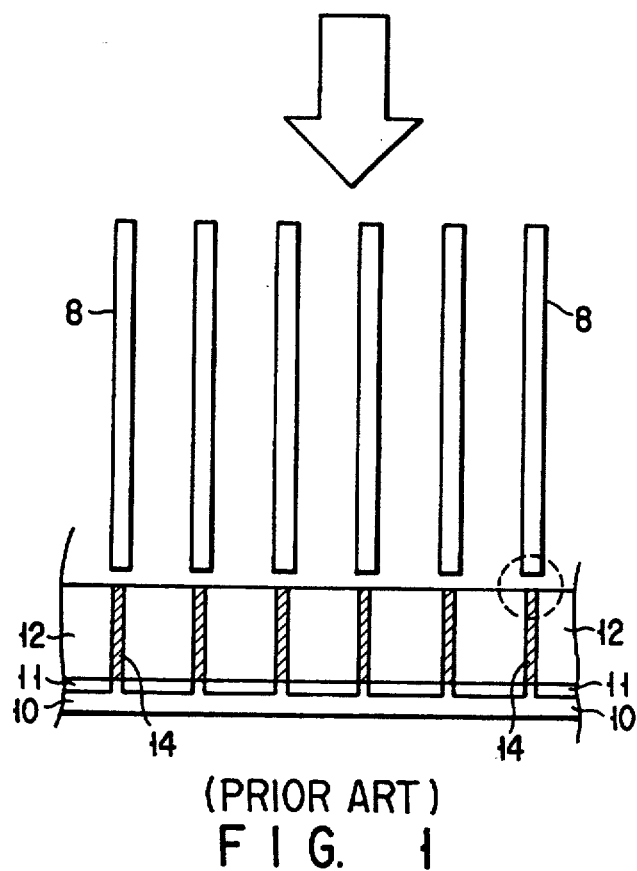
FIG. 1 is a sectional view of a conventional radiation detector.
Figure 2:
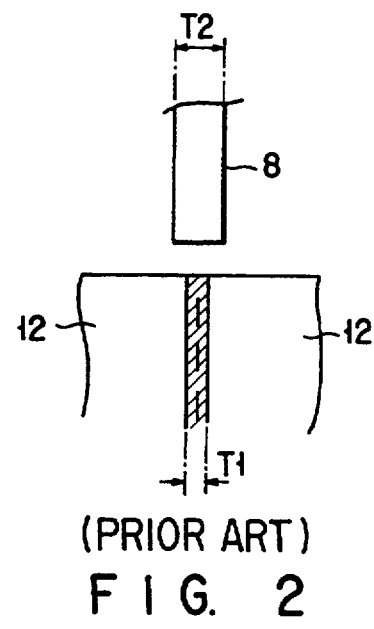
FIG. 2 is an enlarged view of a portion indicated by a dotted circle in FIG. 1.
Figure 3:
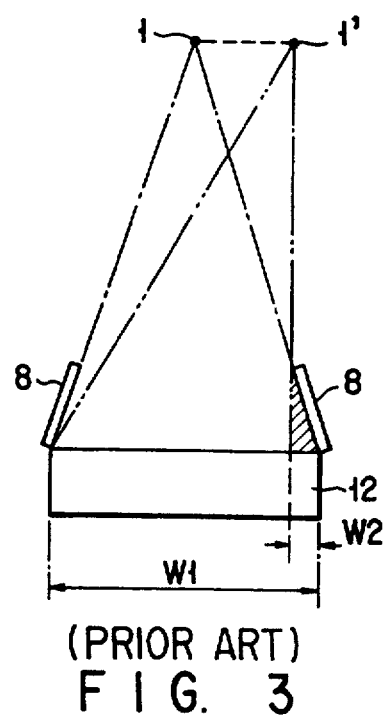
FIG. 3 is a diagram for use in explanation of the production of shade by a collimator plate.
Figure 4:
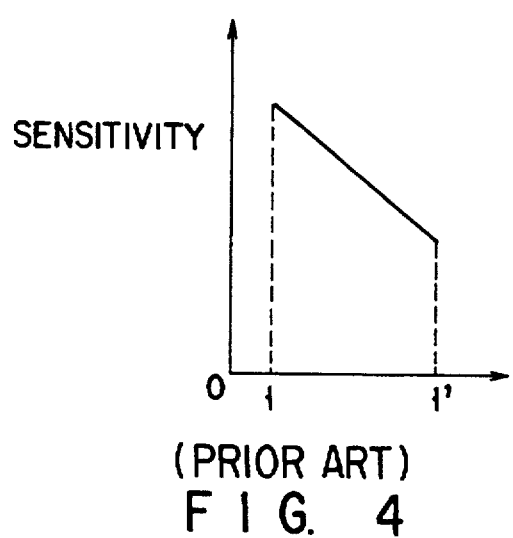
FIG. 4 is a graph indicating the variations in channel sensitivity caused by the movement of the focus of an X-ray tube.
Figure 5:
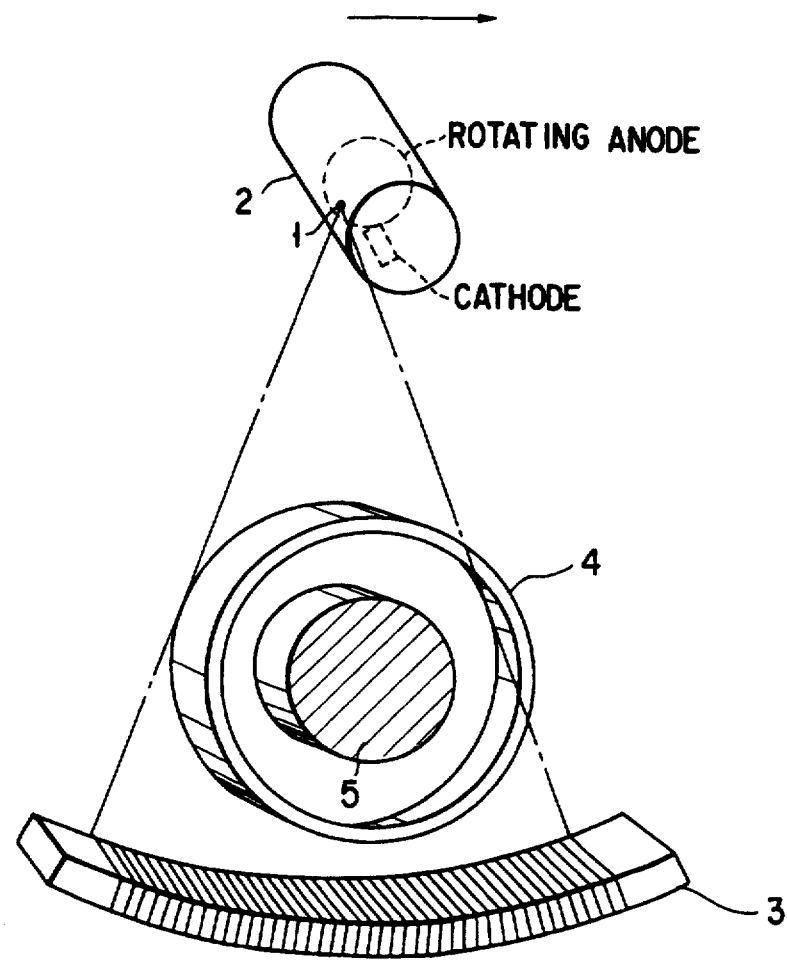
FIG. 5 is a schematic representation of an X-ray computerized tomography apparatus using a radiation detector of the present invention.

The CT apparatus is clinically useful apparatus which performs image reconstruction processing, such as successive approximation or Fourier transformation, on projection data obtained from various directions for a predetermined plane of a subject under examination, computes a CT value at each of points representing the plane, and imparts a proper gradation to the CT value, thereby obtaining a tomography image of the plane of the subject. With the third-generation CT apparatus in which both an X-ray tube and a radiation detector turn around the subject under examination, as shown in FIG. 5, the X-ray tube 2 in which a cathode is placed to face a rotating anode, and X-rays are emitted from a point on the anode at which X-rays from the cathode bombard, that is, its focus 1 and a multichannel radiation detector 3 are supported so that they can turn while facing each other with an aperture 4 interposed therebetween. Data acquisition is performed by repeating emission of X-rays and detection of transmitted X-rays each time the X-ray tube 2 and the radiation detector 3 turn around a subject to be examined placed within the aperture 4 through a very small angle.

The multichannel radiation detector 3 used in such X-ray CT apparatus is constructed as shown in FIG. 6. That is, blocks 7, each having an array of many detector elements thereon, are arranged in the form of a circular arc with center at the focus 1 of the X-ray tube 2. On the X-ray tube side of the blocks 7 is disposed a collimator 9 whose collimator plates 8 stand along the direction of emission of X-rays from the focus 1 of the X-ray tube 2. Each of the collimator plates 8 is placed over the space between adjacent detector elements.

FIG. 7 is a cross-sectional view taken along line A-A' of FIG. 6. A photodiode 11 and a scintillator 12, which forms a one-channel detector element, are stacked in this order on a substrate 10 of the block 7. A housing 13 for supporting the collimator plates 8 are mounted on the block substrate 10.

Figure 8:
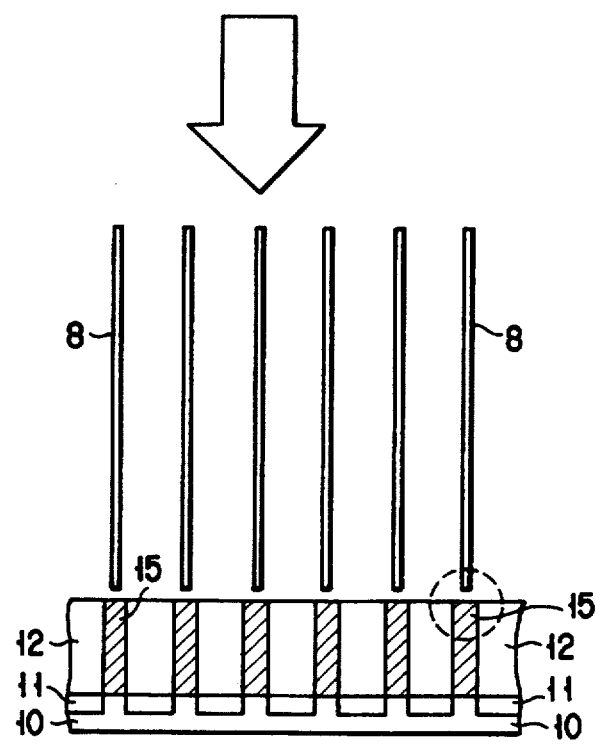
FIG. 8 is a sectional view taken along line B-B' of FIG. 7.

FIG. 8 is a sectional view taken along line B-B' of FIG. 7. As shown in FIG. 8, reflectors 15 (indicated by oblique lines) are each interposed between the scintillators 12 in order to prevent leakage of scintillations from other channels.

Figure 9:
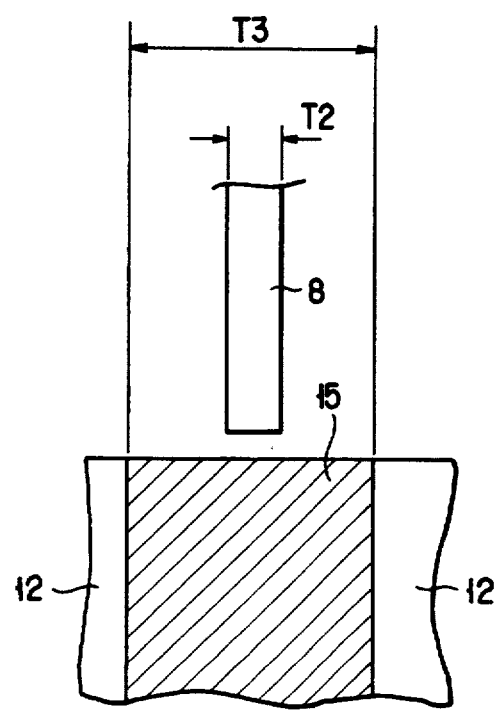
FIG. 9 is an enlarged view of a portion indicated by dotted circuit of FIG. 8.

FIG. 9 is an enlarged view of a portion indicated by dotted circle in FIG. 8. The thickness T3 of the reflector 15 is selected to be sufficiently greater than that of the thickness T2 of the collimator plate 8 to such an extent that, when the focus is located at a point where the anode is at its limiting temperature at which the quantity of heat stored in the anode is critical, the shade of the reflector 15 stays on the reflector 15, in other words, when the shade of the collimator plate does not spread as far as the radiation receiving surface of the scintillator 12 (the detecting surface of a detector element). For example, if the thickness of the collimator plate 8 is 0.1 mm, then the thickness T3 of the reflector 15 will be on the order of 0.2 mm. The center of the collimator plate 8 is aligned with the center of the reflector 15. Thus, the scintillator 12 is placed at a certain distance from an end of the collimator plate 8 in the direction in which the detector elements are arranged.

Figure 10:
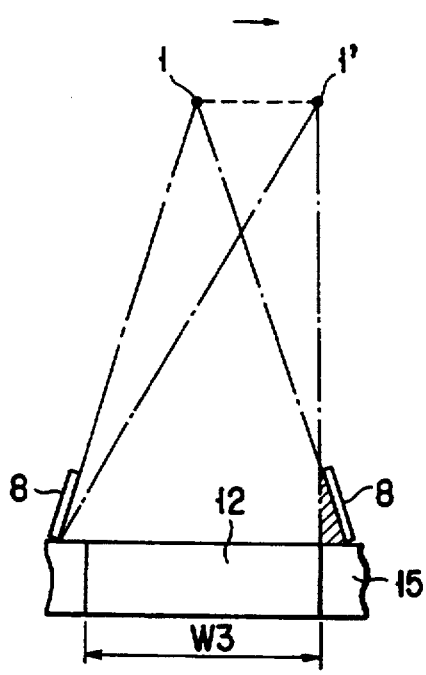
FIG. 10 shows the reflector size.

The operation of the radiation detector constructed as described above will be described with reference to FIG. 10.

After the emission of X-rays is initiated, the X-ray tube plate expands gradually as the temperature inside the tube rises. As a result, the focus L of the X-ray tube will move along the channel direction toward the point 1' that is supposed to be the focus when the tube has reached its limiting temperature at which the quantity of heat stored in the plate electrode is critical.

Figure 11:
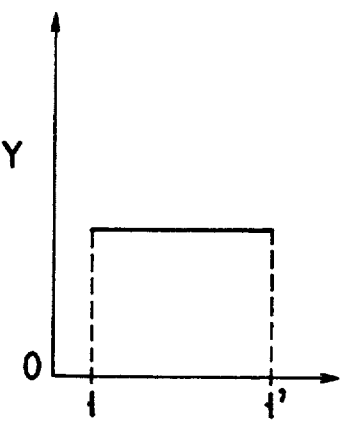
FIG. 11 shows channel sensitivity versus focus movement.

At this point, the collimator plates 8 make shade (indicated by oblique lines) on the reflector 15 because they stand along the direction of X-rays from the original focus 1 of the X-ray tube set at low temperatures. The shade of the collimator plate grows as the focus 1 approaches the focus 1'. When the focus 1 reaches the focus 1', the shade covers the surface of the reflector 15 but does not extend to the surface of the scintillator 12. This is because the thickness T3 of the reflector 15 is made sufficiently great as compared with the thickness T2 of the collimator plate 8. Thus, even if the focus 1 moves the maximum distance, the scintillator 12 will keep its detecting width E3 as W3 was at low temperatures. As a result, the channel sensitivity is stabilized at a fixed level as shown in FIG. 11. Further, if the fluorescent characteristic of the scintillators 12 and the photoelectric transfer characteristic of the photodiodes do not vary from channel to channel, the channels will maintain the uniformity of sensitivity. In other words, the uniformity of the channels in sensitivity can be maintained by correcting detect signals from channels taking only the fluorescent characteristic of the scintillators and the photoelectric transfer characteristic of the photodiodes into consideration.

Figure 12:
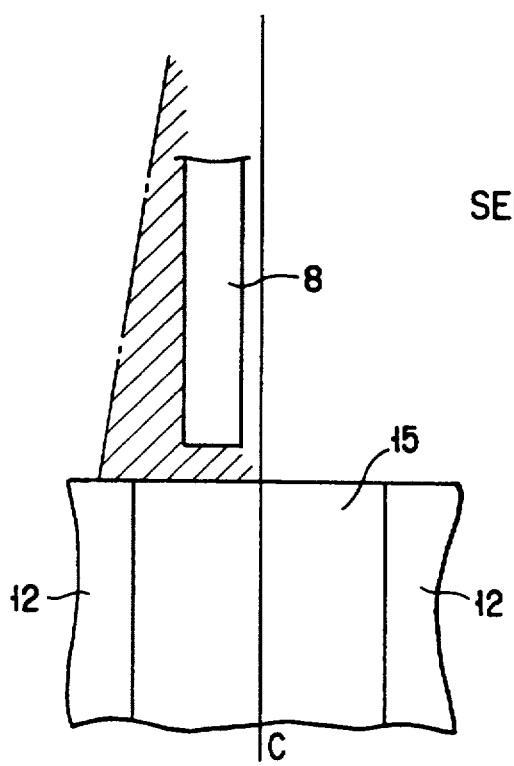
FIG. 12 is a diagram for use in explanation of a collimator plate alignment error.
Figure 13:
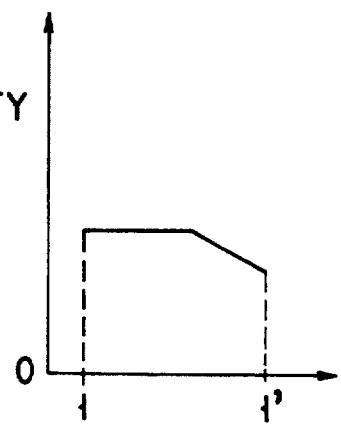
FIG. 13 shows channel sensitivity versus focus movement when such an alignment error as shown in FIG. 12 occurs.

If, as shown in FIG. 12, the collimator plate 8 has an alignment error, that is, if the collimator plate is offset from the center line C of the reflector 15, the collimator plate will begin shading the surface of the scintillator 12 when the focus 1 is on its way to the focus 1'. As shown in FIG. 13, therefore, the channel sensitivity reduces gradually from the point where the collimator plate 8 begins shading the surface of the scintillator 12.

However, the extent of that reduction is considerably smaller than in the case where the sensitivity begins to fall as soon as the focus starts movement as in the prior art. Thus, the uniformity of the channel sensitivity is scarcely lost. The lack of the uniformity of the channel sensitivity can be solved by increasing the thickness T3 of the reflector 15.

Although the preferred embodiment of the present invention has been disclosed and described, it is apparent that other embodiments and modifications are possible. For example, although, in the above embodiment, the center of the collimator plate 8 is in alignment with the center of the reflector 15, the placement of the collimator plate may be altered as follows: the position of the collimator plate is determined on the basis of the position of the focus at low temperatures, and the focus will move from its original position in a predetermined direction with thermal expansion of cathode parts.

Thus, the shade of the collimator plate will not be produced on the side to which the focus moves. Even if the collimator plate is placed displaced to one side of the corresponding reflector in the same direction as the focus moves, therefore, the shade of the collimator plate will not be produced on the surface of the scintillator. In this case, the thickness T3 of the reflector 15 can be decreased to enlarge the detecting surface of the scintillator 12, i.e., the detecting surface of the detector element. This permits an increase in sensitivity. Furthermore, in addition to being applied to the third-generation X-ray CT apparatus, the radiation detector may be used with the fourth-generation X-ray CT apparatus in which a great number of detector elements are arranged in the form of a circumference, and only the X-ray tube turns. Moreover, the radiation detector may be used with a radiation counter.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A radiation detector for detecting radiation emitted from a focal point of a radiation source, wherein the focal point moves from a first position to a second position during operation, comprising:

a plurality of collimator plates oriented along the direction of emission of radiation from said radiation source; and a plurality of detector elements each having a detecting surface for detecting the radiation through a space between adjacent collimator plates, each one of the plurality of the detector elements being located in the space and being separated from at least one of the adjacent collimator plates by a gap with a predetermined width such that the plurality of collimator plates will not shade the detecting surface of the plurality of detector elements wherever the focal point is positioned between the first and second positions.

2. The radiation detector according to claim 1, wherein each one of the plurality of detector elements is separated from each of said adjacent collimator plates by the gap.

3. The radiation detector according to claim 1, wherein each one of said plurality of detector elements is separated from one of the adjacent collimator plates by said gap.

4. The radiation detector according to claim 1, wherein each of said detector elements comprises a layer for converting radiation from said source of radiation into visible light and a layer for converting said visible light into an electrical signal, and a reflector is inserted into said gap.

* * * * *